(12) United States Patent
Zhuo

(10) Patent No.: US 8,371,560 B2
(45) Date of Patent: Feb. 12, 2013

(54) METHOD AND DEVICE FOR EXCHANGING MASS AND ENERGY BETWEEN GAS AND LIQUID

(76) Inventor: Weimin Zhuo, Xuzhou (CN)

( * ) Notice: Subject to any disclaimer, the term of this patent is extended or adjusted under 35 U.S.C. 154(b) by 0 days.

(21) Appl. No.: 13/153,463

(22) Filed: Jun. 5, 2011

(65) Prior Publication Data

US 2011/0232488 A1 Sep. 29, 2011

Related U.S. Application Data

(63) Continuation of application No. PCT/CN2009/070605, filed on Mar. 2, 2009.

(30) Foreign Application Priority Data

Dec. 5, 2008 (CN) .......................... 2008 1 0244462

(51) Int. Cl.
*B01F 3/04* (2006.01)

(52) U.S. Cl. .......... 261/118; 261/DIG. 54; 261/DIG. 56

(58) Field of Classification Search ................... 261/118, 261/DIG. 54, DIG. 56
See application file for complete search history.

(56) References Cited

U.S. PATENT DOCUMENTS 7,377,493 B2 * 5/2008 Thomas .......................... 261/30

* cited by examiner

*Primary Examiner* — Robert A Hopkins
(74) *Attorney, Agent, or Firm* — Matthias Scholl P.C.; Matthias Scholl

(57) ABSTRACT

A device for exchanging energy and/or mass between a gas and a liquid, including a gas-liquid exchanging vessel having a gas inlet end, a gas outlet end and an upper end; a gas inlet pipeline; a gas outlet pipeline; a gas blocking plate; a liquid blocking plate; and a gas passage. The upper end of the gas-liquid exchanging vessel is closed. The gas inlet end of the vessel is connected with the gas inlet pipeline. The gas outlet end of the vessel is connected with the gas outlet pipeline. The gas blocking plate is fitted in the gas inlet end of the vessel. The liquid blocking plate is fitted in the gas outlet end of the vessel. The vessel is filled with liquid. The gas passage formed above the liquid is communicated with the gas inlet pipeline and the gas outlet pipeline.

11 Claims, 2 Drawing Sheets

METHOD AND DEVICE FOR EXCHANGING MASS AND ENERGY BETWEEN GAS AND LIQUID

CROSS-REFERENCE TO RELATED APPLICATIONS

This application is a continuation of International Patent Application No. PCT/CN2009/070605, with an international filing date of Mar. 2, 2009, designating the United States, now pending, and further claims priority benefits to Chinese Patent Application No. 200810244462.2, filed Dec. 5, 2008. The contents of all of the aforementioned applications, including any intervening amendments thereto, are incorporated herein by reference.

BACKGROUND OF THE INVENTION

1. Field of the Invention

The invention relates to a method for energy and mass exchange between gas and liquid, in particular relates to a gas-liquid exchanging method and device in a pipeline.

2. Description of the Related Art

Gas-liquid exchange is a technology commonly and widely applied in the industries. There are many sorts of gas-liquid exchange devices, such as water film, dust catcher, humidifier, and so on. Nowadays, the mass exchange between gas and liquid is a wet dust removing technology that is the most commonly applied, and this technology is mainly applied for separating the dust from the gas, so as to purify the gas; heat exchanger is a device that is commonly applied for energy exchange between gas and liquid, so as to achieve the energy exchange between gas and liquid. However, there are some disadvantages over the traditional gas-liquid exchanging technology, such as huge energy consumption, too large size, complicated structure, etc.

SUMMARY OF THE INVENTION

The objective of this invention is to provide a method for energy and mass exchange between gas and liquid.

A device for gas-liquid exchange in this invention, comprising a gas-liquid exchanging vessel having a gas inlet end, a gas outlet end and an upper end; a gas inlet pipeline; a gas outlet pipeline; a gas blocking plate; a liquid blocking plate; and a gas passage; wherein the upper end of the gas-liquid exchanging vessel is closed; the gas inlet end of the vessel is connected with the gas inlet pipeline; the gas outlet end of the vessel is connected with the gas outlet pipeline; the gas blocking plate is fitted in the gas inlet end of the vessel; the liquid blocking plate is fitted in the gas outlet end of the vessel; the vessel is filled with liquid; the gas passage formed above the liquid is communicated with the gas inlet pipeline and the gas outlet pipeline; and the shape of the gas passage is rectangle.

The method for gas-liquid exchange, comprising the steps of putting gas flow entering into the gas inlet pipeline and the gas-liquid exchanging vessel; forming fast gas flow in the narrow passage due to the blocking of the gas blocking plate; bringing the liquid to leave the liquid surface and spray to the space in the gas passage to form a liquid curtain and liquid droplets by fast gas flow; making a portion of liquid droplets move with the gas flow; separating the liquid droplets from the gas flow and making the liquid droplets fall into the liquid surface due to the cavity thereof after moving a certain distance; making the gas flow contact with the liquid sufficiently and achieving the energy and mass exchange between gas phase and liquid phase; making a portion of liquid move to the liquid blocking plate and form a secondary liquid curtain blocked by the liquid blocking plate; and exhausting the gas flow after exchanging from an outlet under the liquid blocking plate.

The advantages of this invention include small size, low energy consumption, high accuracy, simple structure, and ease of use.

BRIEF DESCRIPTION OF THE DRAWINGS

Detailed description will be given below in conjunction with accompanying drawings.

Figure 1:
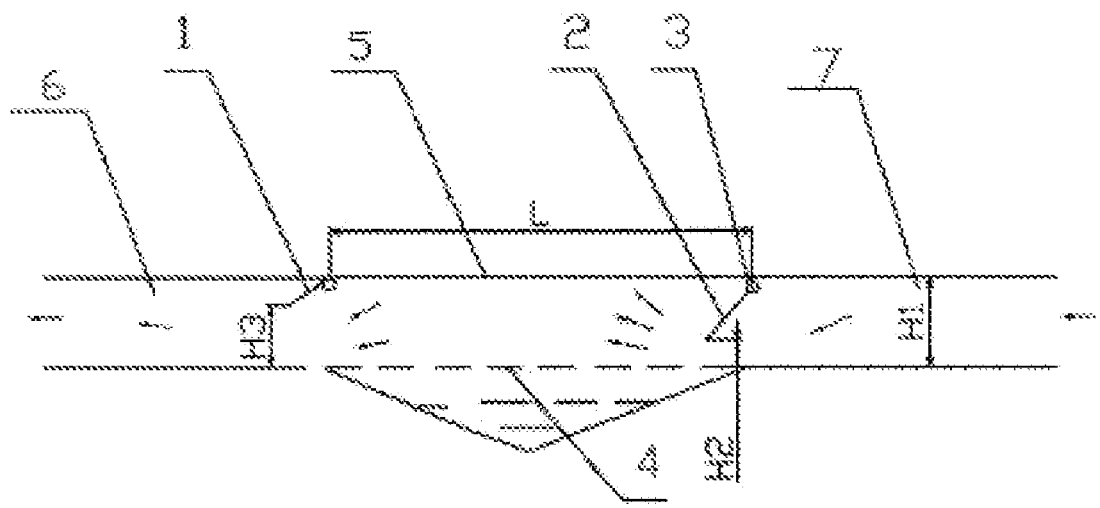
FIG. 1 illustrates the principle of gas-liquid exchange.

In the drawings, the following reference numbers are used: 1-liquid blocking plate, 2-gas blocking plate, 3-shaft, 4-liquid, 5-rectangle gas passage, 6-gas outlet pipeline, 7-gas inlet pipeline, 8-gas-liquid exchanging vessel, 9-1-drain outlet, 9-2-water inlet, 10-overflow port, 11-air extractor, 12-vent pipe, 13-inhaling cover, 14-vertical pipe, and 15-nozzle.

The dashed represents the liquid surface, and the arrow shows the direction of gas flow.

DETAILED DESCRIPTION OF THE EMBODIMENTS

Figure 2:
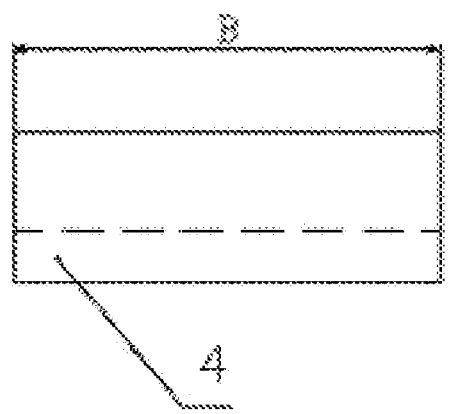
FIG. 2 illustrates the cross-section of the device in FIG. 1.

Referring to FIG. 1 and FIG. 2, one of the preferred embodiments of this invention is that gas-liquid exchanging vessel 8 is a closed rectangle pipeline, and the liquid is stored in the chamber that protrudes downwardly; liquid 4 is injected into the vessel, so that a rectangle gas passage 5 with B in width and H1 in height is formed above the liquid surface. Shaft 3 is installed at the inlet of the rectangle gas passage, and a gas blocking plate 2 is installed on the shaft 3, around which the gas blocking plate 2 can be rotated. A liquid blocking plate 1 that is rotatable is installed at the outlet of the rectangle gas passage. The gap between the bottom of the gas blocking plate 2 and the liquid surface can be regulated so as to form a narrow passage with B in width and H2 in height.

That the gas blocking plate 2 blocks the gas flow leads to the formation of a fast gas flow, and the fast gas flow brings the liquid to leave the liquid surface and sprays to the space in the gas passage 5 to form a liquid curtain and liquid droplets; the gas has to traverse the liquid curtain, a portion of the liquid droplets move forward with the gas flow, and separate from the gas flow due to the gravity thereof after moving a certain distance. During this course, the gas sufficiently contacts with the liquid, so as to achieve the energy exchange and mass exchange between gas phase and liquid phase.

When the gas in the rectangle gas passage 5 flows in the direction as the arrow shows, the liquid is sprayed out of the narrow passage. A portion of liquid may spray onto the surface of the upper wall, and such liquid may move along the surface of the upper wall. When the liquid reaches the liquid blocking plate 1, such liquid may be blocked by said liquid blocking plate 1, and flows downward along said liquid blocking plate 1, so as to build a secondary liquid curtain and spray, and then it is more possible for the gas to contact with the liquid. The gap between the liquid blocking plate 1 and the liquid surface is H3 and this is large enough to avoid the formation of for fast gas flow.

The gap H2 between the bottom of the gas blocking plate 2 and the liquid surface is regulated, so as to regulate the width of the narrow passage. The narrower the passage is, the faster the gas flows, the more the spray is produced, and the further the liquid sprays. It enables the gas to sufficiently contact with the liquid, and the effect of energy exchange and mass exchange will be better. However, the speed of gas flow should not be too high, because the energy consumption rises as the speed of gas flow rises, in addition, the liquid may be nebulized, and this may increase the difficulty of separating the liquid from the gas.

The gap L between the gas blocking plate 2 and the liquid blocking plate 1 is not less than the height that is 3 times as high as H1, so as to ensure enough room for sufficient contact between the gas and the liquid.

The speed of gas flow in the gas passage is no higher than 10 m/s. The effect of separating the gas from the liquid may be poor, if the speed of gas flow is too high, because the gas flow may bring out the liquid.

Figure 3:
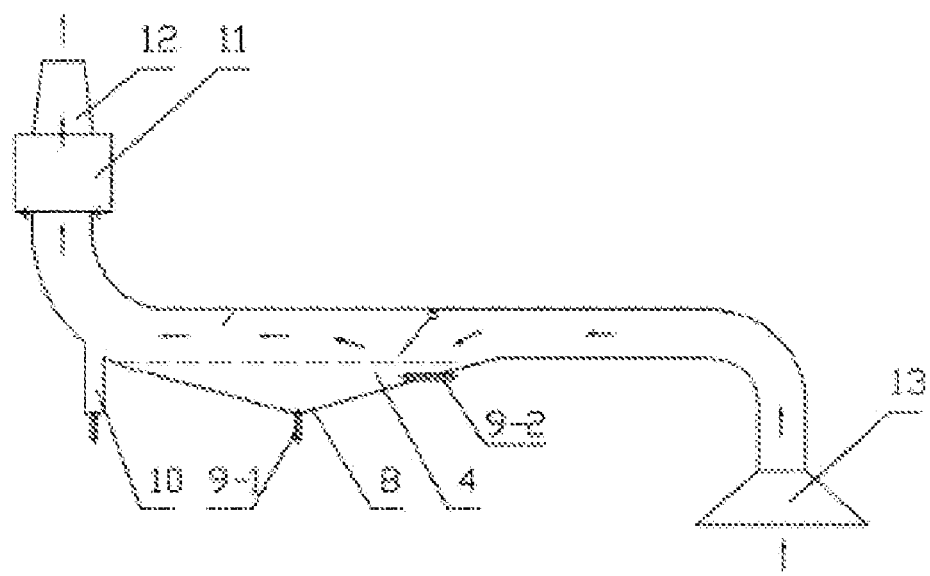
FIG. 3 illustrates one of the preferred embodiments of this invention.

Referring to FIG. 3, this example is about removing the dust from the workshop environment of tobacco factory. In order to facilitate the pollution discharge, an angle of inclination of the lower wall is designed, so as to form a v-shaped chamber at the bottom of the gas-liquid exchanging vessel 8. The v-shaped chamber is fully filled with liquid 4, and the shape of the gas passages above the liquid in the gas inlet pipeline, the shape of the gas outlet pipeline and the shape of the vessel are rectangle. An air extractor 11 is connected to the outlet of the gas outlet pipeline, and the air extractor 11 is an exhaust fan. An overflow port 10 is arranged in front of the gas passage to stabilize the liquid surface. An inhaling cover 13 is arranged on the top of the gas inlet pipeline. A drain outlet 9-1 for discharging the dirty water is arranged at the bottom of the v-shaped vessel, a water inlet 9-2 is arranged for supplying water to the system.

The dust and various volatile gases pervade in the workshop of tobacco factory, and the air quality is very poor. The air containing impurity is inhaled through the inhaling cover 13 by the draft fan 11; the air moves in the direction as the arrow indicates, enters the gas-liquid exchanging vessel 8 and reaches the rectangle gas passage 5 above the liquid in the gas-liquid exchanging vessel; the liquid at the bottom of the gas passage can be tap water, and also can be the waste water circularly used by the system; the fast gas flow is formed in the narrow passage due to the blocking of the gas blocking plate 2, and the fast gas flow brings the liquid to leave the liquid surface and sprays to the space in the gas passage to form a liquid curtain and spray; a portion of the liquid droplets move forward with the gas flow, and separates from the gas flow and fall due to the gravity thereof after moving a certain distance; the liquid blocking plate blocks the liquid on the upper wall, so as to form a secondary liquid curtain and spray. During this course, the gas sufficiently contacts with the liquid, so as to achieve the energy exchange and mass exchange between gas phase and liquid phase; the dust is adsorbed by the liquid, and various volatile gases dissolve in the liquid, so that the air containing impurity is effectively purified. Finally, the purified gas is induced into the workshop by the exhaust fan, so that the environment of the workshop is improved.

This embodiment describes the process of purifying the air in the workshop, so as to achieve the purpose of keeping the health of workers.

This embodiment has the advantages such as low energy consumption and simple structure.

Figure 4:
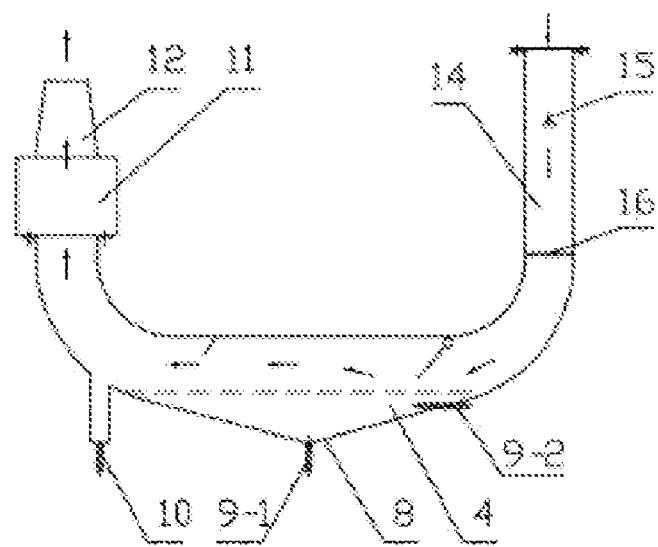
FIG. 4 illustrates another preferred embodiment of this invention.

The FIG. 4 illustrates the high temperature waste gas treatment in the workshop of tobacco factory; the temperature and the humidity of the heated waste gas are very high, which also has high dustiness and is very difficult to treated.

Referring to FIG. 4, the difference between this embodiment and the first embodiment is that the gas inlet pipeline has a vertical pipe 14 with a rectangle cross section extending upwardly; the vertical pipe 14 has a nebulizing nozzle 15, and a pored board 16 is arranged under the nebulizing nozzle 15. The heated waste gas enters the vertical pipe 14 and then forms a gas-liquid phase flow with the water mist produced by the nebulizing nozzle 15. The pored board 16 increases the contact time between the waste gas and the liquid. The heated waste gas is preliminarily treated in the vertical pipe 14, and then enters the rectangle gas passage 5. After that, the preliminarily treated gas is cooled and purified after it traverses the two liquid curtains, and the water mist containing impurity is adsorbed, so as to make sure the liquid will not be taken out by the gas flow. Therefore, the cooling, dehumidifying, dedusting, and deodorizing of the whole system are achieved, and the purified gas is directly induced through the vent pipe 12 into the workshop by the draft fan 11, so as to realize the recycling of gas, thereby protecting the environment.

During the course mentioned above, the energy exchange and mass exchange between gas and liquid are achieved, in addition to the purposes of cooling, dehumidifying, dedusting, and deodorizing the gas.

In this embodiment, as the gas temperature is higher than liquid temperature, the energy is transferred to the liquid from the gas, so as to achieve the energy exchange between gas and liquid. If liquid temperature is higher than gas temperature, the energy will be transferred to the gas from the liquid, so as to achieve the energy exchange between gas and liquid, and meanwhile, the gas also can be humidified.

This embodiment has the advantages such as multi-functionality, high accuracy, low energy consumption, and simple structures.

While particular embodiments of the invention have been shown and described, it will be obvious to those skilled in the art that changes and modifications may be made without departing from the invention in its broader aspects, and therefore, the aim in the appended claims is to cover all such changes and modifications that fall within the true spirit and scope of the invention.

The invention claimed is:

1. A device for gas-liquid exchange, comprising
a gas-liquid exchanging vessel (8) having a gas inlet end, a gas outlet end and an upper end;
a gas inlet pipeline (7);
a gas outlet pipeline (6);
a gas blocking plate (2);
a liquid blocking plate (1); and
a gas passage (5);
wherein
said upper end of the gas-liquid exchanging vessel (8) is closed;
said gas inlet end of the vessel (8) is connected with said gas inlet pipeline (7);
said gas outlet end of the vessel (8) is connected with said gas outlet pipeline (6);
said gas blocking plate (2) is fitted in said gas inlet end of the vessel;
said liquid blocking plate (1) is fitted in said gas outlet end of the vessel;
said vessel is filled with liquid;
said gas passage (5) formed above the liquid is communicated with said gas inlet pipeline (7) and said gas outlet pipeline (6); and
the shape of said gas passage (5) is rectangle.

2. The device of claim 1, wherein said as passage (5) has a height H1, and the gap L between said gas blocking plate (2) and said liquid blocking plate (1) is not less than 3 times the height H1.

3. The device of claim 1, wherein the speed of gas flow in said gas passage is no higher than 10 m/s.

4. The device of claim 2, wherein the speed of gas flow in said gas passage is no higher than 10 m/s.

5. The device of claim 1, wherein a nozzle (15) is installed inside said gas inlet pipeline.

6. The device of claim 5, wherein said nozzle (15) is a nebulizing nozzle.

7. The device of claim 1, wherein the shapes of said gas inlet pipeline and said gas outlet pipeline are rectangle.

8. The device of claim 1 further comprising an overflow port (10), wherein said overflow port (10) is arranged in said gas passage (5).

9. The device of claim 1, wherein an air extractor (11) is connected to the outlet of said gas outlet pipeline.

10. The device of claim 1, wherein said gas blocking plate (2) and liquid blocking plate (1) can be rotated around the shaft (3), so as to regulate the gaps between the plates and the liquid surface.

11. The method for gas-liquid exchange in the device of claim 1, comprising the steps of:
    putting gas flow entering into said gas inlet pipeline and said gas-liquid exchanging vessel (8);
    forming gas flow in the narrow passage due to the blocking of the gas blocking plate (2);
    bringing the liquid to leave the liquid surface and spray to the space in the gas passage to form a liquid curtain and liquid droplets by fast gas flow;
    making a portion of liquid droplets move with the gas flow;
    separating the liquid droplets from the gas flow and making the liquid droplets fall into the liquid surface due to the cavity thereof after moving a certain distance;
    making the gas flow contact with the liquid sufficiently and achieving the energy and mass exchange between gas phase and liquid phase;
    making a portion of liquid move to the liquid blocking plate (1) and form a secondary liquid curtain blocked by the liquid blocking plate; and
    exhausting said gas flow after exchanging from an outlet under the liquid blocking plate.

* * * * *